United States Patent
Botros

(10) Patent No.: US 10,160,889 B2
(45) Date of Patent: Dec. 25, 2018

(54) POLYOLEFIN-BASED COMPOSITIONS, ADHESIVES, AND RELATED MULTI-LAYERED STRUCTURES PREPARED THEREFROM

(71) Applicant: EQUISTAR CHEMICALS, LP, Houston, TX (US)

(72) Inventor: Maged G. Botros, Liberty Township, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 15/523,928

(22) PCT Filed: Feb. 9, 2016

(86) PCT No.: PCT/US2016/017165
§ 371 (c)(1),
(2) Date: May 2, 2017

(87) PCT Pub. No.: WO2016/130556
PCT Pub. Date: Aug. 18, 2016

(65) Prior Publication Data
US 2018/0010022 A1    Jan. 11, 2018

Related U.S. Application Data

(60) Provisional application No. 62/115,970, filed on Feb. 13, 2015.

(51) Int. Cl.
| | |
|---|---|
| *B32B 7/12* | (2006.01) |
| *C08L 23/14* | (2006.01) |
| *B32B 27/32* | (2006.01) |
| *B32B 27/08* | (2006.01) |
| *C09J 123/14* | (2006.01) |
| *B32B 27/30* | (2006.01) |
| *B32B 27/34* | (2006.01) |
| *C08L 23/16* | (2006.01) |
| *C08L 23/12* | (2006.01) |
| *C08L 51/06* | (2006.01) |

(52) U.S. Cl.
CPC .............. *C09J 123/14* (2013.01); *B32B 7/12* (2013.01); *B32B 27/08* (2013.01); *B32B 27/306* (2013.01); *B32B 27/308* (2013.01); *B32B 27/32* (2013.01); *B32B 27/34* (2013.01); *C08L 23/12* (2013.01); *C08L 23/14* (2013.01); *C08L 23/142* (2013.01); *C08L 23/16* (2013.01); *C08L 51/06* (2013.01); *C09J 123/142* (2013.01); *B32B 2307/7242* (2013.01); *B32B 2307/7265* (2013.01); *B32B 2307/732* (2013.01); *C08L 2205/03* (2013.01); *C08L 2205/035* (2013.01); *C08L 2207/02* (2013.01)

(58) Field of Classification Search
CPC ...... C09J 123/14; C09J 23/14; C09J 2205/03; C09J 2205/035; C09J 51/06
See application file for complete search history.

(56) References Cited

U.S. PATENT DOCUMENTS

| | | | | |
|---|---|---|---|---|
| 6,475,582 B1 * | 11/2002 | Phan | ........................ | B32B 1/08 428/36.9 |
| 2010/0174036 A1 * | 7/2010 | Lee | ............................ | B32B 7/12 525/74 |
| 2011/0129666 A1 * | 6/2011 | Botros | ..................... | B32B 7/12 428/355 AC |

FOREIGN PATENT DOCUMENTS

| | | |
|---|---|---|
| WO | WO-2010080110 A1 | 7/2010 |
| WO | WO-2011112790 A1 | 9/2011 |

OTHER PUBLICATIONS

PCT International Search Report and Written Opinion dated May 11, 2016 (May 11, 2016) for Corresponding PCT/US2016017165.

* cited by examiner

*Primary Examiner* — Jeffrey C Mullis

(57) ABSTRACT

The present disclosure relates to polyolefin-based compositions made from or containing (A) a butene-1 polymer grafted with an unsaturated monomer, (B) a second polyolefin polymer, and (C) an ethylene-propylene elastomer. In some embodiments, the polyolefin-based composition is further made from or contains an additives composition. In additional embodiments, the polyolefin-based composition is made from or contains a heterophasic polypropylene copolymer.

12 Claims, No Drawings

POLYOLEFIN-BASED COMPOSITIONS, ADHESIVES, AND RELATED MULTI-LAYERED STRUCTURES PREPARED THEREFROM

CROSS-REFERENCE TO RELATED APPLICATIONS

This application is the U.S. National Phase of PCT International Application PCT/US2016/017165, filed Feb. 9, 2016, claiming benefit of priority to U.S. Provisional Application No. 62/115,970, filed Feb. 13, 2015, which is incorporated herein by reference in its entirety.

FIELD OF THE INVENTION

The present disclosure relates to polyolefin-based compositions useful as adhesives, tie-layer adhesive for multi-layered structures, coupling agents, compatibilizers and/or oil modifiers.

BACKGROUND OF THE INVENTION

Tie-layer adhesives are used to bond polyolefins to dissimilar substrates in multi-layer, co-extruded structures for blown and cast films, extrusion coatings, blow moldings, sheet extrusions, wires and cables, pipes and other industrial applications. The adhesives are useful for bonding plastic, wood, glass, paper, composite and metal substrates. The adhesives can be used in lamination, extrusion (or coextrusion), sheet extrusion, extrusion coating, injection molding, blow molding, melt thermoforming and other industrial processes.

SUMMARY OF THE INVENTION

In some embodiments, the present disclosure provides for a polyolefin-based composition made from or containing (A) a butene-1 polymer grafted with an unsaturated monomer, (B) a second polyolefin polymer, and (C) an ethylene-propylene elastomer. In further embodiments, the polyolefin-based composition is further made from or contains an additives composition. In additional embodiments, the polyolefin-based composition is further made from or contains a heterophasic polypropylene copolymer. In some embodiments, the present disclosure provides for a polyolefin-based composition made from or containing:

(A) from about 1 to about 30 weight percent of a first polymer composition, relative to the total weight of the polyolefin-based composition, made from or containing a butene-1 polymer grafted with an unsaturated monomer, (B) from about 30 to about 80 weight percent of a second polymer composition, relative to the total weight of the polyolefin-based composition, made from or containing a second polyolefin polymer, and (C) from about 1 to about 30 weight percent of a third polymer composition, relative to the total weight of the polyolefin-based composition, made from or containing an ethylene-propylene elastomer.

In some embodiments, the present disclosure provides for an adhesive made from or containing a polyolefin-based composition. In further embodiments, the present disclosure provides for a multi-layered structure made from or contains a tie-layer adhesive, wherein the tie-layer adhesive is made from or contains a polyolefin-based composition. In additional embodiments, the present disclosure provides for a coupling agent, a compatibilizer and/or an oil modifier made from or containing a polyolefin-based composition.

While multiple embodiments are disclosed, still other embodiments will become apparent to those skilled in the art from the following detailed description. Certain embodiments, as disclosed herein, are capable of modifications in various aspects, all without departing from the spirit and scope of the claims as presented herein. Accordingly, the detailed description is to be regarded as illustrative in nature and not restrictive.

DETAILED DESCRIPTION OF THE INVENTION

As used in this specification and the claims, the singular forms "a," "an," and "the" include plural referents unless the context dictates otherwise.

As used in this specification and the claims, the terms "comprising," "containing," or "including" mean that at least the named compound, element, material, particle, method step, etc., is present in the composition, the article or the method, but does not exclude the presence of other compounds, elements, materials, particles, method steps, etc., even if the additional compounds, elements, materials, particles, method steps, etc., have the same function as that which is named, unless expressly excluded in the claims. It is also to be understood that the mention of one or more method steps does not preclude the presence of additional method steps before or after the combined recited steps or intervening method steps between those steps expressly identified.

Moreover, it is also to be understood that the lettering of process steps or ingredients is a means for identifying discrete activities or ingredients and the recited lettering can be arranged in any sequence, unless expressly indicated.

For the purpose of the present description and of the claims which follow, except where otherwise indicated, numbers expressing amounts, quantities, percentages, etc., are to be understood as being modified by the term "about". Also, ranges include any combination of the maximum and minimum points disclosed and include any intermediate ranges therein, which may or may not be specifically enumerated herein.

Definitions

In the present description, the term "additives composition" refers to a composition made from or containing at least one additive.

In the present description, the terms "adhesive layer" and "tie layer" mean a layer or material placed on one or more substrates to promote the adhesion of that substrate to another layer. Adhesive layers can be positioned between two layers of a multilayer structure to maintain the two layers in position relative to each other and prevent delamination.

In the present description, the term "α-olefin" or "alpha-olefin" means an olefin of formula $CH_2=CH-R$ wherein R is a linear or branched alkyl containing from 1 to 10 carbon atoms. The α-olefin can be selected, for example, from propylene, 1-butene, 1-pentene, 1-hexene, 1-octene, 1-dodecene and related olefins.

In the present description, the term "amorphous polyolefin" refers to an olefinic polymer having a crystallinity from 0.001 to about 5 weight percent, based upon the total weight of the olefinic polymer.

In the present description, the term "butene-1 polymer" refers to butene-1 homopolymers, copolymers and mixtures thereof. Examples of α-olefins which may be present as comonomers in the butene-1 polymer are ethylene, propylene, pentene-1, hexene-1, 4-methyl-1-pentene and octene-1.

In the present description, the term "crystalline polyolefin" means an olefinic polymer having a crystallinity of more than about 70 weight percent and less than about 93 weight percent, based upon the total weight of the olefinic polymer.

In the present description, the term "elastomer" refers to polymer compounds having rubber-like properties and crystallinity in the range of from about 0.1 percent to about 20 percent.

In the present description, the term "first" refers to the order in which a particular species is presented and does not necessarily indicate that a "second" species will be presented. For example, "first polymer composition" refers to the first of at least one polymer composition. The term does not reflect priority, importance, or significance in any other way. Similar terms used that may be used herein include "second," "third," "fourth," etc.

In the present description, the term "grafted polyolefin" refers to a polyolefin grafted with an unsaturated monomer. The unsaturated monomer can be an unsaturated polar monomer and contain one or more oxygen atoms.

In the present description, the term "heterophasic polypropylene copolymer" refers to a copolymer prepared by the copolymerization of ethylene and propylene to produce a polypropylene matrix. The polypropylene matrix may comprise a homopolymer or a copolymer.

In the present description, the term "highly crystalline polyolefin" means olefinic polymer having a crystallinity from about 93 to about 100 weight percent, based upon the total weight of the olefinic polymer.

In the present description, the term "homopolymer" as used herein is consistent with its ordinary meaning. To the extent that a homopolymer may contain one or more monomeric units, the incorporation of any additional monomeric units has no measurable effect on the polymer's primary, secondary, or tertiary structure or no effect on the polymer's physical or chemical properties. In other words, there is no measurable difference between a polymer comprising 100 weight percent of a first monomeric unit, and a co-polymer that includes more than one monomeric units.

In the present description, the terms "monomer" and "comonomer" are used interchangeably. The terms mean any compound with a polymerizable moiety that is added to a reactor in order to produce a polymer. In those instances in which a polymer is described as comprising one or more monomers, e.g., a polymer comprising propylene and ethylene, the polymer comprises units derived from the monomers, e.g., $-CH_2-CH_2-$, and not the monomer itself, e.g., $CH_2=CH_2$.

In the present description, "plastic film packaging" is discussed throughout this description. To facilitate that discussion, various polymer acronyms are used herein. When referring to blends of polymers, the description may use a colon (:) to indicate that the components to the left and right of the colon are blended. When referring to a multi-layer structure, the description may use a slash "/" to indicate that components to the left and right of the slash are in different layers and the relative position of components in layers may be indicated by use of the slash to indicate layer boundaries. Acronyms employed herein include:

EAA: Copolymer of ethylene with acrylic acid
EAO: Copolymers of ethylene with at least one alpha-olefin
EBA: Copolymer of ethylene with butyl acrylate
EEA: Copolymer of ethylene with ethyl acrylate
EMA: Copolymer of ethylene with methyl acrylate
EMAA: Copolymer of ethylene with methacrylic acid
EVA: Copolymer of ethylene with vinyl acetate
EVOH: Saponified or hydrolyzed copolymer of ethylene and vinyl acetate
PB: Polybutylene-1 (a butylene homopolymer or copolymer of a major portion of butylene-1 with one or more alpha-olefins)
PE: Polyethylene (an ethylene homopolymer or copolymer of a major portion of ethylene with one or more alpha-olefins)
PP: Polypropylene homopolymer or copolymer
PET: Polyethylene terephthalate
PETG: Glycol-modified polyethylene terephthalate
PLA: Polylactic acid
PVDC: Polyvinylidene chloride (also includes copolymers of vinylidene chloride with vinyl chloride or methyl acrylate (MA)).

In the present description, the term "plastomer" refers to ethylene-$C_{3-8}$ α-olefin copolymers wherein ethylene is the major constituent prepared using metallocene catalysts. Plastomers exhibit both thermoplastic and elastomeric properties.

In the present description, the term "polymer" means a macromolecular compound prepared by polymerizing monomers of the same or different type. The term "polymer" includes homopolymers, copolymers, terpolymers, interpolymers, etc.

In the present description, the term "polymer composition" refers to a composition made from or containing at least one polymer.

In the present description, the term "polyolefin" is used herein to include polymers such as polyethylene, ethylene-alpha olefin copolymers (EAO), polypropylene, polybutene and ethylene copolymers having at least about 50 percent by weight of ethylene polymerized with a lesser amount of a comonomer such as vinyl acetate, and other polymeric resins within the "olefin" family classification.

Polyolefins may be made by a variety of processes including batch and continuous processes using single, staged or sequential reactors, slurry, solution, and fluidized bed processes and one or more catalysts including, for example, heterogeneous and homogeneous systems and Ziegler, Phillips, metallocene, single-site, and constrained geometry catalysts to produce polymers having different combinations of properties.

In the present description, the term "room temperature" refers to a temperature around 25 degrees Celsius (25° C.).

In the present description, the term "semiamorphous polyolefin" means an olefinic polymer having a crystallinity of from about 5 to about 30 weight percent, based upon the total weight of the olefinic polymer.

In the present description, the term "semicrystalline polyolefin" means an olefinic polymer having a crystallinity of more than about 30 weight percent and less than about 70 weight percent, based upon the total weight of the olefinic polymer.

In the present description, the term "thermoplastic polymer" means a polymer that softens when exposed to heat and returns to its original condition when cooled to room temperature.

Testing

The ASTM D 792 test methods are entitled "Test Methods for Density and Specific Gravity (Relative Density) of Plastics by Displacement." The term "ASTM D 792" as used herein refers to the standard test method(s) for determining the specific gravity (relative density) and density of solid plastics in forms such as sheets, rods, tubes and molded items. The test method includes determining the mass of a specimen of the solid plastic in air, determining the apparent mass of the specimen upon immersion in a liquid, and calculating the specimen's specific gravity (relative density). This test method was approved on Jun. 15, 2008 and published July 2008, the contents of which are incorporated herein by reference in its entirety.

ASTM D 1238 is entitled "Test Method for Melt Flow Rates of Thermoplastics by Extrusion Plastometer." The term "ASTM D 1238" as used herein refers to the standard test method for determining melt flow rates of thermoplastics by an extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Feb. 1, 2012 and published March 2012, the contents of which are incorporated herein by reference in its entirety.

Throughout the present description and claims, the standard melt index values of polyethylene polymers are measured according to ASTM D 1238, using a piston load of 2.16 kg and at a temperature of 190° C. The High Load Melt Index (or HLMI) values are also measured according to ASTM D 1238, but using a piston load of 21.6 kg and at a temperature of 190° C.

Throughout the present description and claims, the standard melt flow rate values of polypropylene polymers are measured according to ASTM D 1238, using a piston load of 2.16 kg at a temperature of 230° C.

ASTM D 1505 is entitled "Standard Test Method for Density of Plastics by Density-Gradient Technique." The term "ASTM D 1505" as used herein refers to the standard test method for determining density of plastics by the density-gradient technique. In general, this test method is based on observing the level to which a test specimen sinks in a liquid column exhibiting a density gradient, in comparison with standards. This test method was approved on Jul. 1, 2010 and published September 2010, the contents of which are incorporated herein by reference in their entirety.

ASTM D 1876 is entitled "Standard Test Method for Peel Resistance of Adhesives (T-Peel Test)." The term "ASTM D 1876" as used herein refers to a test method for determining the relative peel resistance of adhesive bonds between flexible adherends by means of a T-type specimen. The accuracy of the results of strength tests of adhesive bonds will depend on the conditions under which the bonding process is carried out. This test method was approved on Oct. 10, 2001 and published December 2001, the contents of which are incorporated herein by reference in their entirety.

The force required to separate the multi-layer structure apart in a T-peel configuration at 25.4 cm (10 inches)/min is measured using an INSTRON™ tensile tester. The average adhesion of five specimens is recorded as the peel strength in kg/cm (lb/in).

The referenced ASTM standards are available from the ASTM website, www.astm.org, or by contacting ASTM Customer Service at service@astm.org.

Incorporated Unsaturated Monomer (Weight Percent): The amount of the unsaturated monomer incorporated into the grafted polyolefin can be measured by wet chemical methods (titration, etc.) or Fourier transform infrared spectroscopy (FTIR).

"Molecular Weight Distribution (MWD; $M_w/M_n$)" is measured by gel permeation chromatography. MWD and the ratio $M_w/M$ are determined using a Waters 150-C ALC/Gel Permeation Chromatography (GPC) system equipped with a TSK column set (Type GMHXL-HT) working at 135° C. with 1,2-dichlorobenzene as the solvent (ODCB; stabilized with 0.1 vol. of 2,6-di-t-butyl p-cresole (BHT)) at a flow rate of 1 ml/min. The sample is dissolved in ODCB by stirring continuously at a temperature of 140° C. for 1 hour. The solution is filtered through a 0.45 µm Teflon membrane. The filtrate (concentration: 0.08-1.2 g/l; injection volume: 300 µl) is subjected to GPC. Monodisperse fractions of polystyrene (provided by Polymer Laboratories) are used as the standard.

"X-Ray Crystallinity" is measured with an X-ray Diffraction Powder Diffractometer using Cu-Kα1 radiation with fixed slits and collecting spectra between diffraction angles 2Θ=5° and 2Θ=35° with a step of 0.1° every six (6) seconds. Measurements are performed on compression molded specimens in the form of disks of about 1.5 mm to about 2.5 mm of thickness and about 2.5 cm to about 4.0 cm of diameter. These specimens are obtained using a compression molding press at a temperature of about 200° C.±5° C. without any appreciable applied pressure for 10 minutes, then applying a pressure of about 10 kg/cm² for a few seconds and repeating this last operation three (3) times. The resulting diffraction pattern is used to derive the components for the degree of crystallinity by defining a linear baseline for the whole spectrum and calculating the total area (Ta), expressed in counts/sec·2Θ, between the spectrum profile and the baseline. An amorphous profile is thereby defined, along the whole spectrum, that separates, according to the two-phase model, the amorphous regions from the crystalline ones. It is therefore possible to calculate the amorphous area (Aa), expressed in counts/sec·2Θ, as the area between the amorphous profile and the baseline, and the crystalline area (Ca), expressed in counts/sec·2Θ, as Ca=Ta−Aa. The degree of crystallinity of the sample is then calculated according to the formula:

percent Cr=100×Ca/Ta

In a general embodiment, the present disclosure provides for a polyolefin-based composition made from or containing (A) a first polymer composition made from or containing a butene-1 polymer grafted with an unsaturated monomer, (B) a second polymer composition made from or containing a second polyolefin polymer, and (C) a third polymer composition made from or containing an ethylene-propylene elastomer.

First Polymer Composition: Butene-1 Polymer Grafted with an Unsaturated Monomer. The first polymer composition is made from or contains a butene-1 polymer grafted with an unsaturated monomer. In an embodiment, the first polymer composition is present in an amount from about 1 to about 30 weight percent, relative to the total weight of the polyolefin-based composition. In other embodiments, the first polymer composition is present in an amount from about 5 to about 15 weight percent. In some embodiments, the first polymer composition is present in 5, 6, 7, 8, 9, 10, 11, 12, 13, 14, or 15 weight percent, relative to the total weight of the polyolefin-based composition.

In some embodiments, the butene-1 polymer grafted with an unsaturated monomer is prepared by reacting a butene-1 polymer with unsaturated monomers at elevated temperatures, with or without a free-radical initiator, under conditions effective to graft unsaturated monomer units onto the butene-1 polymer backbone. The grafting reaction can occur in the presence of an inert gas, such as nitrogen or argon, or in air. Examples of the butene-1 polymer are those commercially available from LyondellBasell Industries under the trademark KOATTRO™. Examples of KOATTRO™ butene-1 polymers include KT AR05. In particular embodiments, the butene-1 polymer can be a plastomer.

Unsaturated monomers can be ethylenically unsaturated carboxylic acids and acid derivatives, particularly esters, anhydrides, acid salts, and the like. Examples include acrylic acid, methacrylic acid, maleic acid, fumaric acid, itaconic acid, citraconic acid, maleic anhydride, tetrahydrophthalic anhydride, norborn-5-ene-2,3-dicarboxylic acid anhydride, nadic anhydride, himic anhydride and related compounds, as well as mixtures thereof. Other unsaturated monomers are described in U.S. Pat. No. 6,385,777 and U.S. Pat. App. Pub. No. 2007/0054142, the teachings of which are incorporated herein by reference.

The relative amounts of butene-1 polymer and unsaturated monomer used will vary and depend on factors such as the nature of the butene-1 polymer and the unsaturated monomer, the desired tie-layer properties, the reaction conditions, the available equipment and other factors. The unsaturated monomer can be used in an amount within the range of about 0.1 to about 15 weight percent, based on the total weight of the grafted polyolefin. In other embodiments, the unsaturated monomer can be in the range of from about 0.5 to about 6 weight percent. In some embodiments, the range can be from about 1 to about 3 weight percent. In some embodiments, the polyolefin grafted with an unsaturated monomer is a butene-1 polymer grafted with maleic anhydride.

Second Polymer Composition: Polyolefin Polymer. The second polymer composition is made from or contains a second polyolefin polymer. In an embodiment, the second polymer composition is present in an amount from about 30 to about 80 weight percent, relative to the total weight of the polyolefin-based composition. In other embodiments, the second polymer composition is present in an amount from about 35 to about 70 weight percent. In some embodiments, the second polymer composition is present in 35, 40, 45, 50, 55, 60, 65, or 70 weight percent, relative to the total weight of the polyolefin-based composition. Examples of polymers for use in making the second polymer composition include polymers made from or containing one or more $C_2$ to $C_{10}$ α-olefin monomers. Such polymers can be selected from the group consisting of polyethylenes, polypropylenes, polybutenes and related compounds, as well as mixtures thereof.

The polyethylenes include ethylene homopolymers, copolymers of ethylene with at least one $C_3$ to $C_{10}$ α-olefin, the like, and mixtures thereof. Such polyethylenes include HDPE, LDPE, MDPE, LLDPE, the like, and mixtures thereof.

The polypropylenes include amorphous polypropylene, semicrystalline polypropylene and related compounds, as well as mixtures thereof. In some embodiments, the semicrystalline polypropylene is selected from the group consisting of propylene homopolymers, copolymers of propylene with at least one additional $C_2$ to $C_{10}$ α-olefin and related compounds, as well as mixtures thereof. Copolymers of propylene include random copolymers and impact copolymers. In some embodiments, α-olefins for such copolymers include ethylene, 1-butene, 1-pentene, 1-hexene, methyl-1-butenes, methyl-1-pentenes, 1-octene, 1-decene and related compounds, as well as mixtures thereof. The semicrystalline polypropylene can have a melt flow rate (MFR) from about 0.001 to about 500 grams per 10 minutes (g/10'), a density from about 0.897 to about 0.925 grams per cubic centimeter (g/cm³) and an average molecular weight ($M_w$) within the range of 85,000 to 900,000.

Examples of polypropylenes for use in the present technology are commercially available polypropylenes including LyondellBasell PRO-FAX™ SR257M random copolymer polypropylene, having ethylene as the comonomer, a specific gravity of 0.90, a melt flow rate of 2.0 grams per 10 minutes, and a polydispersity index of 3.3. The polybutenes for use in the present technology include homopolymers of 1-butene, copolymers of 1-butene with at least one additional $C_2$ to $C_{10}$ α-olefin and related compounds, as well as mixtures thereof. In some embodiments, α-olefins for such copolymers include ethylene, propylene, 1-pentene, 1-hexene, methyl-1-butenes, methyl-1-pentenes, 1-octene, 1-decene and related compounds, as well as mixtures thereof.

Third Polymer Composition: Ethylene-Propylene Elastomer. The third polymer composition is made from or contains an ethylene-propylene elastomer. In an embodiment, the third polymer composition is present in an amount from about 1 to about 30 weight percent, relative to the total weight of the polyolefin-based composition. In other embodiments, the third polymer composition is present in an amount from about 10 to about 30 weight percent. In some embodiments, the third polymer composition is present in 20, 21, 22, 23, 24, or 25 weight percent, relative to the total weight of the polyolefin-based composition. Examples of ethylene-propylene elastomers include ethylene-propylene rubber (EPR), ethylene-propylene-diene monomer rubber (EPDM) and related compounds, as well as mixtures thereof. In some embodiments, the ethylene-propylene elastomers can contain from about 10 to about 80 weight percent of ethylene recurring units, based upon the total weight of the olefin elastomer.

In particular embodiments, the ethylene-propylene elastomer is an ethylene-propylene rubber (EPR) having (a) a melt index from about 0.2 to about 20.0 grams per 10 minutes and (b) a total content of ethylene-derived units in an amount from about 55 to about 85 weight percent, based upon the total weight of the ethylene propylene rubber. Commercially available ethylene-propylene elastomers for use in the present technology include Lanxess Corporation's BUNA™ EP T2070 (68 weight percent ethylene and 32 weight percent propylene, based on the total weight of the copolymer); BUNA™ EP T2370 (3 weight percent ethylidene norbornene, 72 weight percent ethylene, and 25 weight percent propylene, based on the total weight of the copolymer), BUNA™ EP T2460 (4 weight percent ethylidene norbornene, 62 weight percent ethylene, and 34 weight percent propylene, based on the total weight of the copolymer), ExxonMobil Chemical's VISTALON™ 707 (72 weight percent ethylene and 28 weight percent propylene, based on the total weight of the copolymer); VISTALON™ 722 (72 weight percent ethylene and 28 weight percent propylene, based on the total weight of the copolymer); and VISTALON™ 828 (60 weight percent ethylene and 40 weight percent propylene, based on the total weight of the copolymer).

Examples of the ethylene-propylene elastomers also include ExxonMobil Chemical's VISTAMAXX™ elastomers, particularly grades 6100, 1100, and 3000, and The Dow Chemical Company's VERSIFY™ elastomers, particularly grades DP3200.01, DP3300.01, and DP3400.01, which have ethylene contents of 9 weight percent, 12 weight percent, and 15 weight percent, respectively, based upon the total weight of the copolymer. Additional EPDM rubbers include Dow's NORDEL™ hydrocarbon rubber, e.g., the 3722P, 4760P, and 4770R grades.

Additives Composition. In some embodiments, the polyolefin-based composition is further made from or to contain an additives composition. In those embodiments, the additives composition is present in an amount from about 0.1 to about 5 weight percent, relative to the total weight of the polyolefin-based composition. In other embodiments, the additives composition is present in an amount of 1, 2, 3, 4, or 5 weight percent, relative to the total weight of the polyolefin-based composition. Exemplary additives include colorants, odorants, deodorants, plasticizers, impact modifiers, nucleating agents, lubricants, surfactants, wetting agents, flame retardants, ultraviolet light stabilizers, antioxidants, biocides, metal deactivating agents, thickening agents, heat stabilizers, defoaming agents, coupling agents, polymer alloy compatibilizing agent, blowing agents, emulsifiers, crosslinking agents, waxes, particulates, flow promoters, and other materials added to enhance processability or end-use properties of the polymeric components.

Heterophasic Polypropylene Copolymer. In some embodiments, the polyolefin-based composition is further made from or to contain a heterophasic polypropylene copolymer. In those embodiments, the heterophasic polypropylene copolymer is present in an amount from about 0.1 to about 30 weight percent, relative to the total weight of the polyolefin-based composition. In other embodiments, the heterophasic polypropylene copolymer is present in an amount of about 10, 15, 20, or 25 weight percent, relative to the total weight of the polyolefin-based composition. In an embodiment, heterophasic polypropylene copolymers can have (a) a melt flow rate in the range of about 1 gram per 10 minutes to about 40 grams per 10 minutes and (b) a density in the range of about 0.870 to about 0.910 grams per cubic centimeter. The heterophasic polypropylene copolymer can be prepared by sequential polymerization in at least two stages and in the presence of Ziegler-Natta catalyst supported on a magnesium halide in active form. The polymerization process, which can be a continuous or batch process, is carried out in liquid phase, in the presence or not of inert diluent, or in gas phase, or by mixed liquid-gas techniques. The stereospecific polymerization catalysts comprise the product of the reaction between: 1) a solid component, containing a titanium compound and an electron-donor compound (internal donor) supported on magnesium dihalide; 2) an aluminum alkyl compound (cocatalyst); and, optionally, 3) an electron-donor compound (external donor). Such heterophasic polypropylene copolymers are commercially available from LyondellBasell Industries under the trademarks ADFLEX™, HIFAX™ and PROFAX™.

Adhesive. In some embodiments, the present disclosure provides an adhesive made from or containing a polyolefin-based composition. The adhesive composition can take any form, e.g., hot-melt, pressure sensitive, solvent-based, etc. Tie layer and laminate adhesive compositions are examples.

Tie-Layer Structure. The adhesives are useful as a tie-layer for making multi-layer structures such as films and sheets, including barrier films. A film can have a thickness of less than about 10 mils while a sheet has a thickness of at least about 10 mils. The multi-layer structures have at least two layers in addition to the adhesive layer, which bonds the other layers together. In some embodiments, at least one layer serves as a barrier layer. Tie-layer adhesives of the present disclosure can be used in numerous multi-layer structures, including structures having from 2 to 11 polymer-based layers. In another general embodiment, the present disclosure provides a multi-layered structure made from and/or containing: (A) a tie-layer adhesive, and (B) a polymer layer.

Multi-layer films can be made by coextrusion and can include a polyolefin layer such as PP. LDPE, LLDPE, HDPE, EVA, ethylene-acrylic acid copolymers, ethylene-methacrylic acid copolymers, ethylene-acrylic acid ester copolymers, ethylene-methacrylic acid ester copolymers, ionomers, and related compounds. Barrier resins can be polar polymers such as ethylene-vinyl alcohol (EVOH) or polyamide resins such as nylon.

Tie-layer adhesives of the present disclosure can be used in numerous multi-layer barrier film constructions. Generic illustrative multi-layer constructions include the following:

PE/tie-layer/barrier/tie-layer/PP/tie-layer/PE
PE/tie-layer/barrier/tie-layer/PE/tie-layer/PP
PP/tie-layer/barrier/tie-layer/PE/tie-layer/PP
PE/tie-layer/barrier/tie-layer/PE/tie-layer/PE
PP/tie-layer/barrier/tie-layer/PP/tie-layer/PP
PE/tie-layer/barrier/tie-layer/PE
PE/tie-layer/barrier/tie-layer/PP
PP/tie-layer/barrier/tie-layer/PP In some embodiments, the multi-layered structure can have three layers, comprising a first polymer layer, a tie-layer and a second polymer layer. The first polymer layer can have a thickness in the range of about 20 to about 50 percent, based upon the total thickness of the structure. The tie-layer can have a thickness in the range of about 3 to about 12 percent, based upon the total thickness of the structure. The second polymer layer can have a thickness in the range of about 20 to about 50 percent, based upon the total thickness of the structure.

In some embodiments, the multi-layered structure can have five layers, having a first polymer layer, a first tie-layer, a second polymer layer, a second tie-layer and a third polymer layer. The first polymer layer can have a thickness in the range of about 20 to about 50 percent, based upon the total thickness of the structure. The first tie-layer can have a thickness in the range of about 3 to about 12 percent, based upon the total thickness of the structure. The second polymer layer can have a thickness in the range of about 3 to about 15 percent, based upon the total thickness of the structure. The second tie-layer can have a thickness in the range of about 3 to about 12 percent, based upon the total thickness of the structure. The third polymer layer can have a thickness in the range of about 20 to about 50 percent, based upon the total thickness of the structure.

In particular embodiments, the multi-layered structure can be (a) about a 3-mil film and have a 9-day adhesion in the range of about 0.085 kg/cm to about 0.120 kg/cm, (b) about a 5-mil film and have a 9-day adhesion in the range of about 0.185 kg/cm to about 0.300 kg/cm, or (c) about a 20-mil sheet and have a 9-day adhesion in the range of about 0.300 kg/cm to about 1.100 kg/cm.

In some embodiments, the present disclosure provides for a coupling agent, a compatibilizer, or an oil modifier made from or containing a polyolefin-based composition.

Examples

The following examples are included to demonstrate embodiments. It should be appreciated by those of skill in the art that the techniques disclosed in the examples which follow represent techniques discovered to function well. However, those of skill in the art should, in light of the present disclosure, appreciate that many changes can be made in the specific embodiments which are disclosed and still obtain a like or similar result without departing from the spirit and scope of this disclosure.

For the comparative examples and the examples herein, various compounds were formulated to prepare test specimen. The materials were admixed in the weight percents shown in Tables 1 and 2.

Grafted Comparative Polyolefin Polymer: For the comparative example, a grafted polyolefin was prepared by feeding a polypropylene impact copolymer (specific gravity: 0.90; Melt Flow Rate: 1.8 grams per 10 minutes; Polydispersity Index: 9.7) and maleic anhydride (2 weight percent, based on total charged reactants) to a COPERION™ ZSK-92 twin-screw extruder having zones heated at temperatures ranging from 160-192° C. and operated at shear rates within the range of 300-400 rpm and under nitrogen. The extruder had eleven heating zones, which were heated as followed; zone 1 (160° C.); zones 2-5 (143° C.); zones 6-9 (195° C.); and zones 9-11 (193° C.).

Grafted Butene-1 Polymer: LyondellBasell's KOATTRO™ KT AR05 butene-1 polymer was used as the first polyolefin polymer. (KOATTRO™ KT AR05 butene-1 polymer has a density of 0.890 grams per cubic centimeter and a melt index of 0.5 grams per 10 minutes.) Similar to the comparative grafted polyolefin, the grafted butene-1 polymer was prepared by feeding the butene-1 polymer and maleic anhydride to a COPERION™ ZSK-92 twin-screw extruder having zones heated at temperatures ranging from 160-192° C. and operated at shear rates within the range of 300-400 rpm. The extruder had eleven heating zones, which were heated as followed; zone 1 (160° C.); zones 2-5 (143° C.); zones 6-9 (195° C.); and zones 9-11 (193° C.). The process was performed (a) under nitrogen or (b) in air. The grafted polyolefin polymer had an incorporated unsaturated monomer amount of about 1.5 weight percent.

Second Polyolefin Polymer: LyondellBasell's PROFAX™ SR257M random copolymer polypropylene, having ethylene as the comonomer, a specific gravity of 0.90, a melt flow rate of 2.0 grams per 10 minutes, and a polydispersity index of 3.3.

Ethylene-Propylene Elastomer: ExxonMobil Company's VISTALON™ 722 ethylene propylene rubber, having 72 weight percent ethylene recurring units, based upon the total weight of the EPR (Melt Index of 1.0 grams per 10 minutes).

Heterophasic Polypropylene Copolymer: LyondellBasell's ADFLEX™ KS311P heterophasic polypropylene copolymer, having a density of 0.89 grams per cubic centimeter and a melt flow rate of 9.5 grams per 10 minutes.

Additives: B225 which is a 1:1 blend of IRGANOX™ 1076 sterically-hindered phenolic antioxidant and IRGAFOS™ 168 trisarylphosphite processing stabilizer.

Compounding Conditions: All components were dry blended. Then, the formulated materials were melt compounded.

Film/Sheet Preparation: Five-layer structures of 3 mil, 5 mil and 20 mil were prepared to evaluate the adhesion of the tie-layer composition. The multilayer structures had an A/B/C/B/A layer structure, where A represents the outer layer, B represents the tie-layer and C represents the barrier layer. The outer layers were prepared with polypropylene, and the barrier layer was prepared with an ethylene vinyl alcohol (EVOH) copolymer. The structures were produced on a Killion extruder (Killion Extruders, Inc., Cedar Grove, N.J., USA; in this example, three such extruders were used) with a barrel length to barrel diameter (L/D) ratio of 24:1, a barrel diameter of about 2.54 cm (1 inch) to about 3.18 cm (1.25 inches), 3 barrel heating zones and a 10 inch flat die to produce a continuous 8 inch specimen.

TABLE 1

| Component/Test | Comp. Ex. 1 | Ex. 2 | Ex. 3 | Ex. 4 | Ex. 5 |
|---|---|---|---|---|---|
| Grafted Comparative Polyolefin Polymer (wt. %) | 10 | — | — | — | — |
| Grafted Butene-1 Polymer (Nitrogen) (wt. %) | — | 10 | — | 10 | — |
| Grafted Butene-1 Polymer (Air) (wt. %) | — | — | 10 | — | 10 |
| SR 257M Polypropylene (wt. %) | 69.85 | 69.85 | 69.85 | 64.85 | 64.85 |
| 722 Ethylene-Propylene Rubber (wt. %) | 20 | 20 | 20 | 25 | 25 |
| KS311P heterophasic polypropylene (wt. %) | — | — | — | — | — |
| B225 (wt. %) | 0.15 | 0.15 | 0.15 | 0.15 | 0.15 |
| Total (wt. %) | 100 | 100 | 100 | 100 | 100 |
| 9-Day Adhesion, kg/cm (lb/in) (20-Mil Sheet) | 0.261 (1.46) | 0.622 (3.48) | 0.313 (1.75) | 0.560 (3.13) | 0.451 (2.52) |

All weight percents are based upon the total weight of the final composition.

TABLE 2

| Component/Test | C. Ex. 1 | Ex. 6 | Ex. 7 | Ex. 8 | Ex. 9 | Ex. 10 | Ex. 11 |
|---|---|---|---|---|---|---|---|
| Grafted Comparative Polyolefin Polymer (wt. %) | 10 | — | — | — | — | — | — |
| Grafted Butene-1 Polymer (Nitrogen) (wt. %) | — | 10 | — | 10 | — | 10 | — |
| Grafted Butene-1 Polymer (Air) (wt. %) | — | — | 10 | — | 10 | — | 10 |
| SR 275M Polypropylene (wt. %) | 69.85 | 59.85 | 59.85 | 44.85 | 44.85 | 39.85 | 39.85 |
| 722 Ethylene-Propylene Rubber (wt. %) | 20 | 20 | 20 | 20 | 20 | 25 | 25 |
| KS311P heterophasic polypropylene (wt. %) | | 10 | 10 | 25 | 25 | 25 | 25 |
| B225 (wt. %) | 0.15 | 0.15 | 0.15 | 0.15 | 0.15 | 0.15 | 0.15 |
| Total (wt. %) | 100 | 100 | 100 | 100 | 100 | 100 | 100 |
| 9-Day Adhesion, kg/cm (lb/in) (3-Mil Film) | 0.104 (0.58) | — | — | — | — | 0.111 (0.62) | 0.093 (0.52) |
| 9-Day Adhesion, kg/cm (lb/in) (5-Mil Film) | 0.136 (0.76) | — | — | — | — | 0.191 (1.07) | 0.25 (1.40) |
| 9-Day Adhesion, kg/cm (lb/in) (20-Mil Sheet) | 0.261 (1.46) | 0.442 (2.47) | 0.844 (4.72) | 0.578 (3.23) | 1.014 (5.67) | 0.701 (3.92) | 0.848 (4.74) |

All weight percents are based upon the total weight of the final composition.

It should be understood that various changes, substitutions and alterations can be made herein without departing from the spirit and scope of this disclosure as defined by the appended claims. Moreover, the scope of the present application is not intended to be limited to the particular embodiments of the process, machine, manufacture, composition of matter, means, methods and steps described in the specification. As one of the ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A polyolefin-based composition comprising:
   (A) a first polymer composition comprising a butene-1 polymer grafted with maleic anhydride, wherein the butene-1 polymer is a plastomer;
   (B) a second polymer composition comprising a second polyolefin polymer; and
   (C) a third polymer composition comprising an ethylene-propylene elastomer.

2. The polyolefin-based composition of claim 1, further comprising an additives composition having one or more additives.

3. The polyolefin-based composition of claim 1, wherein the second polyolefin polymer is a polypropylene polymer.

4. The polyolefin-based composition of claim 3, wherein the second polyolefin polymer is a polypropylene random copolymer.

5. The polyolefin-based composition of claim 1, wherein the ethylene-propylene elastomer is selected from the group consisting of:
   (A) an ethylene-propylene rubber (EPR); and
   (B) an ethylene-propylene-diene monomer rubber (EPDM).

6. The polyolefin-based composition of claim 5, wherein the ethylene-propylene elastomer is an ethylene-propylene rubber (EPR) having
   (A) a melt index from about 0.2 to about 20.0 grams per 10 minutes (measured with a 2.16 kg load and at a temperature of 190° C.); and
   (B) a total content of ethylene-derived units in an amount from about 55 to about 85 weight percent, based upon the total weight of the ethylene propylene rubber.

7. The polyolefin-based composition of claim 1, further comprising a fourth polymer composition comprising a heterophasic polypropylene copolymer.

8. A polyolefin-based composition comprising:
   (A) from about 1 to about 30 weight percent of a first polymer composition, relative to the total weight of the polyolefin-based composition, comprising a butene-1 polymer grafted with maleic anhydride, wherein the butene-1 polymer is a plastomer;
   (B) from about 30 to about 80 weight percent of a second polymer composition, relative to the total weight of the polyolefin-based composition, comprising a second polyolefin polymer; and
   (C) from about 1 to about 30 weight percent of a third polymer composition, relative to the total weight of the polyolefin-based composition, comprising an ethylene-propylene elastomer.

9. A multi-layered structure comprising a tie-layer adhesive comprising a polyolefin-based composition comprising:
   (A) from about 1 to about 30 weight percent of a first polymer composition, relative to the total weight of the polyolefin-based composition, comprising a butene-1 polymer grafted with maleic anhydride, wherein the butene-1 polymer is a plastomer;
   (B) from about 30 to about 80 weight percent of a second polymer composition, relative to the total weight of the polyolefin-based composition, comprising a second polyolefin polymer; and
   (C) from about 1 to about 30 weight percent of a third polymer composition, relative to the total weight of the polyolefin-based composition, comprising an ethylene-propylene elastomer.

10. The multi-layered structure of claim 9 is about a 3-mil film and has a 9-day adhesion in the range of about 0.085 kg/cm to about 0.120 kg/cm.

11. The multi-layered structure of claim 9 is about a 5-mil film and has a 9-day adhesion in the range of about 0.185 kg/cm to about 0.300 kg/cm.

12. The multi-layered structure of claim 9 is about a 20-mil sheet and has a 9-day adhesion in the range of about 0.300 kg/cm to about 1.100 kg/cm.

* * * * *

UNITED STATES PATENT AND TRADEMARK OFFICE
CERTIFICATE OF CORRECTION

PATENT NO. : 10,160,889 B2  
APPLICATION NO. : 15/523928  
DATED : December 25, 2018  
INVENTOR(S) : Botros Page 1 of 1

It is certified that error appears in the above-identified patent and that said Letters Patent is hereby corrected as shown below:

In the Specification

In Column 1, Line 52, delete "monomer," and insert -- monomer; --, therefor

In Column 1, Line 56, delete "polymer," and insert -- polymer; --, therefor

In Column 6, Line 3, delete "$M_w/M$" and insert -- $M_w/M_n$ --, therefor

In Column 6, Line 18, delete "‑2Θ=50 and 2Θ=35°" and insert -- 2Θ=5° and 2Θ=35° --, therefor In Column 8, Line 49, delete "copolymer)," and insert -- copolymer); --, therefor In Column 8, Line 52, delete "copolymer)," and insert -- copolymer); --, therefor In Column 10, Line 5, delete "PP." and insert -- PP, --, therefor In the Claims In Column 14, Line 37, Claim 10, after "9" insert -- , --

In Column 14, Line 40, Claim 11, after "9" insert -- , --

In Column 14, Line 43, Claim 12, after "9" insert -- , --

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*